US012662077B2

(12) United States Patent
Jang

(10) Patent No.: US 12,662,077 B2
(45) Date of Patent: Jun. 23, 2026

(54) SIDE AIRBAG DEVICE

(71) Applicant: HYUNDAI MOBIS CO., LTD., Seoul (KR)

(72) Inventor: Rae Ick Jang, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/262,238

(22) Filed: Jul. 8, 2025

(65) Prior Publication Data

US 2026/0091753 A1      Apr. 2, 2026

(30) Foreign Application Priority Data

Oct. 2, 2024     (KR) ........................ 10-2024-0133768

(51) Int. Cl.
B60R 21/231 (2011.01)
(52) U.S. Cl.
CPC .................. B60R 21/23138 (2013.01); *B60R 2021/23146* (2013.01)
(58) Field of Classification Search
CPC ................ B60R 21/23138; B60R 2021/23146
See application file for complete search history.

(56) References Cited

U.S. PATENT DOCUMENTS

| | | | | |
|---|---|---|---|---|
| 7,614,650 B2 * | 11/2009 | Yokota | .................. | B60R 21/237 |
| | | | | 280/730.2 |
| 7,753,407 B2 * | 7/2010 | Yokota | .................. | B60R 21/201 |
| | | | | 280/730.2 |
| 8,684,408 B2 * | 4/2014 | Thomas | .............. | B60R 21/2338 |
| | | | | 280/730.2 |

FOREIGN PATENT DOCUMENTS

| | | | | | |
|---|---|---|---|---|---|
| CN | 119546490 | A | * 2/2025 | ....... | B60R 21/23138 |
| DE | 202025102999 | U1 | * 7/2025 | ....... | B60R 21/23138 |
| KR | 20210138365 | A | * 11/2021 | ........... | B60R 21/264 |
| KR | 20220046338 | A | * 4/2022 | ....... | B60R 21/23138 |
| WO | WO-2020255817 | A1 | * 12/2020 | ........... | B60R 21/233 |

* cited by examiner

*Primary Examiner* — Faye M Fleming
(74) *Attorney, Agent, or Firm* — NovoTechIP International PLLC

(57) ABSTRACT

An embodiment discloses a side airbag device including an airbag cushion that inflates with gas and deploys between a driver seat and a passenger seat and an inflator that is mounted on a mount provided in a rear end portion of the airbag cushion and is disposed inside the airbag cushion, wherein the airbag cushion includes a restraining portion disposed at a position corresponding to a shoulder of an occupant, and the restraining portion is configured to restrain movement of the occupant in a state in which the restraining portion is not inflated by the gas.

13 Claims, 6 Drawing Sheets

I-I

SIDE AIRBAG DEVICE

CROSS-REFERENCE TO RELATED APPLICATIONS

The present application claims priority to and the benefit under 35 USC § 119 of Korean Patent Application No. 10-2024-0133768, filed on Oct. 2, 2024, in the Korean Intellectual Property Office, the entire disclosure of which is incorporated herein by reference in its entirety for all purposes.

TECHNICAL FIELD

The present invention relates to a side airbag device, and more specifically, to a center side airbag device disposed between a driver seat and a passenger seat.

BACKGROUND

In general, vehicles are equipped with various types of airbag devices to protect occupants in the event of a collision, and among them, side airbag devices are designed to deploy in a direction in which a side collision occurs to protect occupants.

Among side airbag devices, a center side airbag device installed such that a cushion faces an interior in which a center console of a vehicle is located, and the cushion is deployed between a driver seat occupant and a passenger seat occupant and limits the movement of the occupants toward the inside of the vehicle due to a reaction of a side collision to protect the heads and chests of the occupants.

However, in an actual collision situation, when there is no occupant in the passenger seat, the side airbag device may not restrain the movement of the driver seat occupant because the side airbag device does not have a self-supporting force and may collapse according to the lateral movement of the occupant, thus failing to effectively protect the occupant.

In addition, a phenomenon in which the cushion rotates and moves away from the occupant due to the ineffective restraint of the movement of the occupant occurs, and thus the occupant moves toward the adjacent seat and is not protected. Therefore, there is a need to improve this.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to a side airbag device capable of sufficiently restraining an occupant when an airbag cushion is deployed from a seatback.

Objects of the present invention are not limited to the object described above, and other objects that are not described will be clearly understood by those skilled in the art from the description below.

According to an embodiment of the present invention, there is provided a side airbag device including an airbag cushion that inflates with gas and deploys between a driver seat and a passenger seat and an inflator that is mounted on a mount provided in a rear end portion of the airbag cushion and is disposed inside the airbag cushion, wherein the airbag cushion includes a restraining portion disposed at a position corresponding to a shoulder of an occupant, and the restraining portion is configured to restrain movement of the occupant in a state in which the restraining portion is not inflated by the gas.

The restraining portion may include a first restraining portion and a second restraining portion that extend in a longitudinal direction of the airbag cushion, and a gas passage through which the gas passes may be provided between the first restraining portion and the second restraining portion.

Each of the first restraining portion and the second restraining portion may have a structure in which a width decreases from an upper portion toward a lower portion of the airbag cushion.

The side airbag device may further include a sub-cushion that is attached to a surface of the airbag cushion facing the passenger seat and protrudes from the airbag cushion while being inflated by the gas.

The sub-cushion may be provided to overlap the gas passage, and a gas hole connected to the sub-cushion is formed in the surface of the airbag cushion facing the passenger seat.

A thickness of the sub-cushion in inflation may be smaller than a thickness of the airbag cushion in inflation.

The restraining portion may be provided as a structure surrounded by a sewing line that joins panels constituting the airbag cushion.

The side airbag device may further include a tether that passes through the airbag cushion to be connected to the airbag cushion.

The airbag cushion may include a tether hole through which the tether passes.

The airbag cushion may include an inner non-inflatable portion provided in a center of a chamber that is surrounded by a sewing line and inflated by the gas, and an outer non-inflatable portion disposed outside the chamber, and the tether hole may be formed in each of the inner non-inflatable portion and the outer non-inflatable portion.

Figure 1:
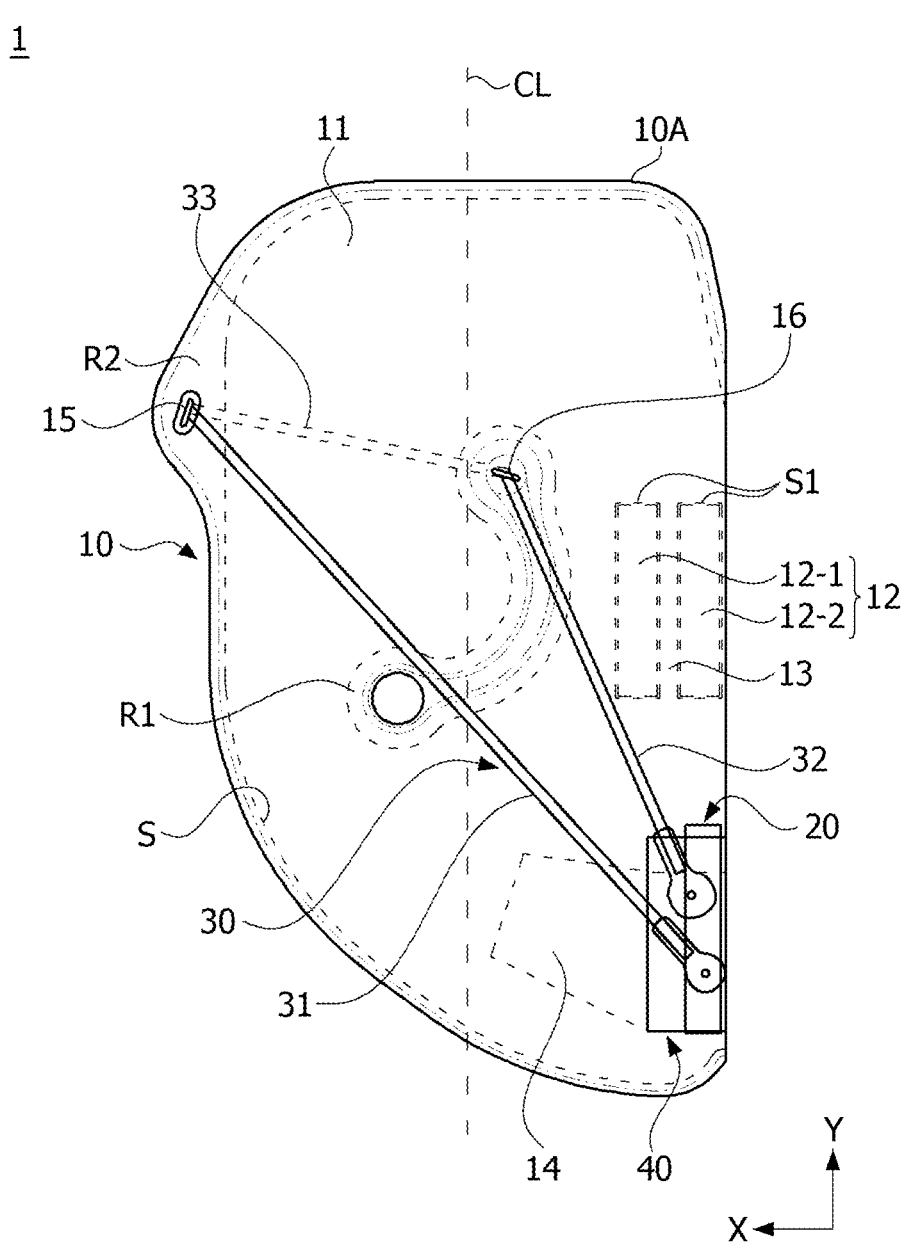
FIG. 1 is a view showing a side airbag device according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
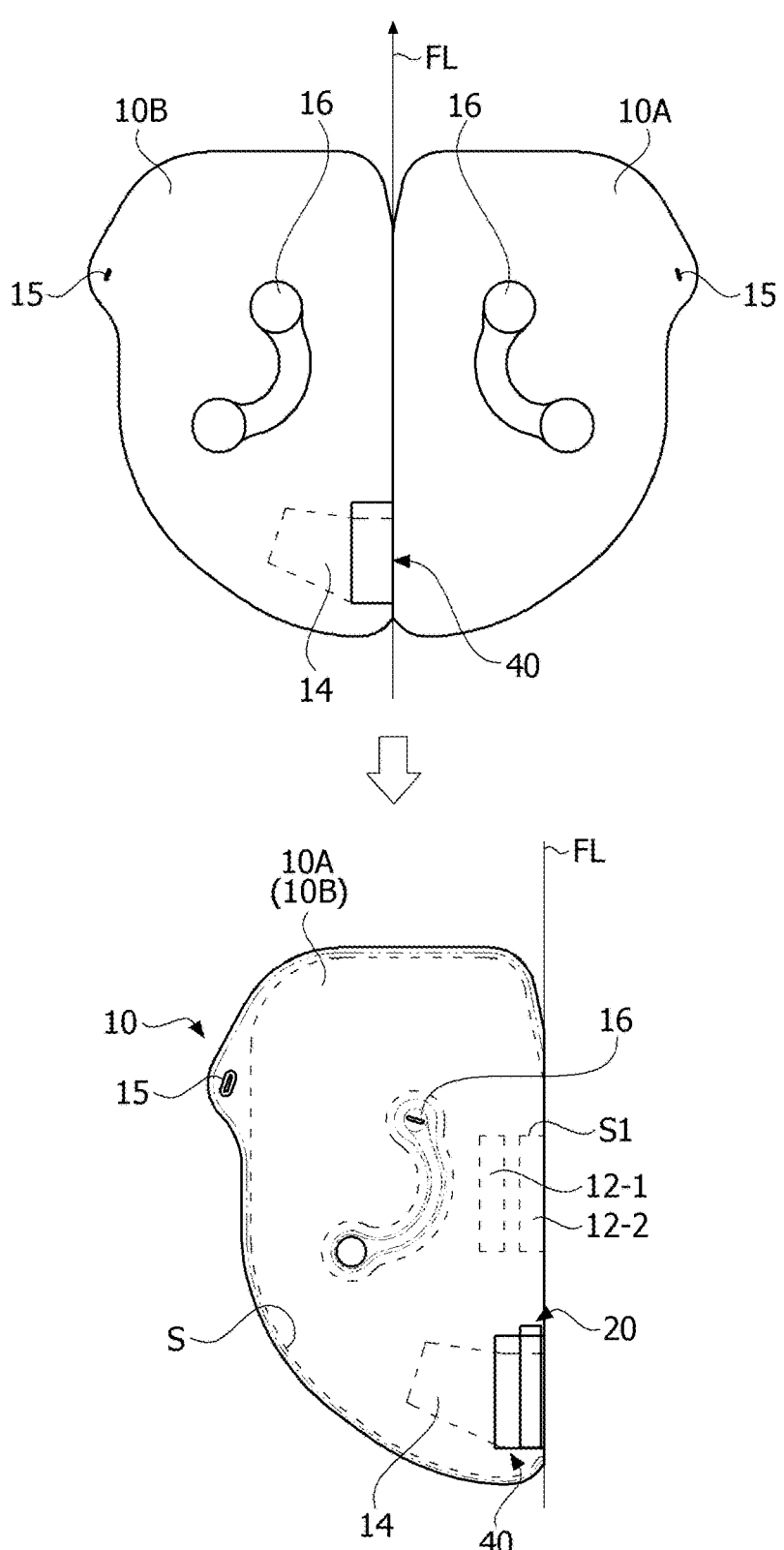
FIG. 2 is a view showing an airbag cushion in the side airbag device according to the embodiment of the present invention.
Figure 3:
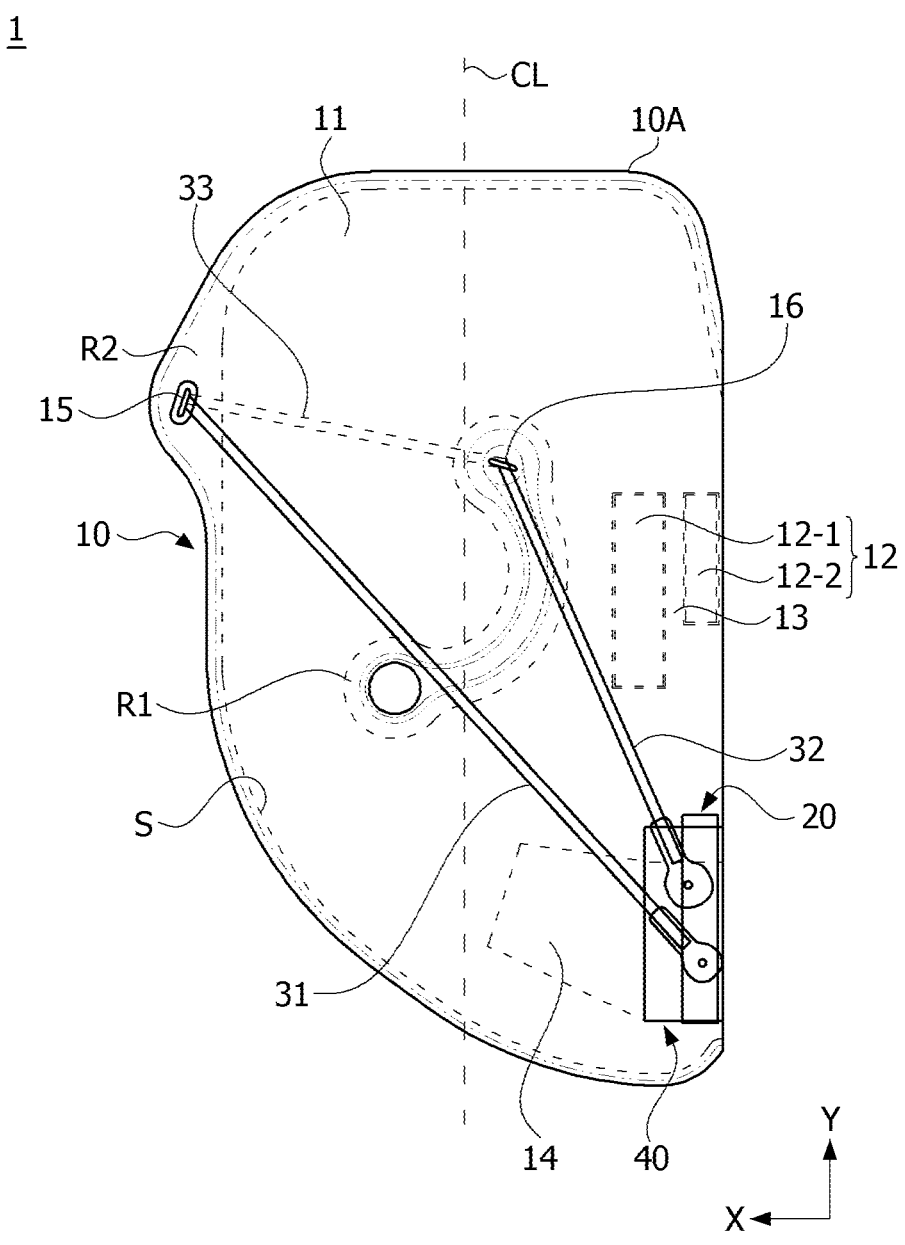
FIGS. 3 and 4 are views showing various embodiments of a restraining portion in the side airbag device.
Figure 4:
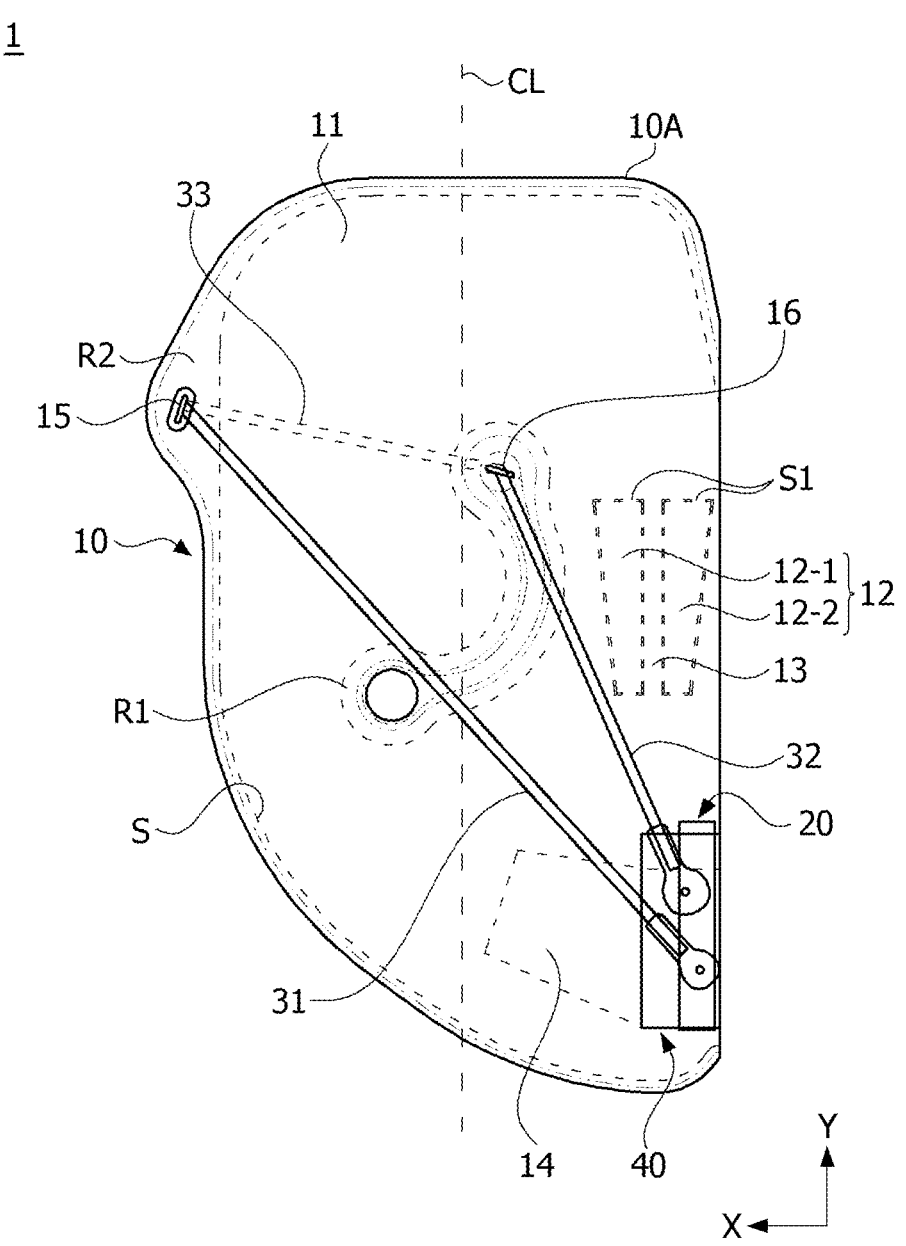

FIG. 1 is a view showing a side airbag device according to an embodiment of the present invention, FIG. 2 is a view showing an airbag cushion in the side airbag device according to the embodiment of the present invention, and FIGS. 3 and 4 are views showing various embodiments of a restraining portion in the side airbag device.

A side airbag device 1 according to the embodiment of the present invention may be installed on a side surface of a driver seatback (not shown) of a vehicle and operated in the event of a vehicle collision to protect occupants. In this case, the side surface of the seatback on which the side airbag device 1 is installed may be positioned toward a passenger seat.

In the present embodiment, the side airbag device 1 is exemplified as being installed on the driver seatback, but the present invention is not limited thereto, and the side airbag device 1 may be installed on the passenger seatback in some embodiments.

Referring to the drawings, the side airbag device 1 according to the embodiment of the present invention may include an airbag cushion 10 and an inflator 20. The side airbag device 1 may include a tether 30 according to an embodiment.

The airbag cushion 10 may be installed on the side surface of the seatback and deployed between the driver seat and the passenger seat from the side surface of the seatback while being inflated with gas generated and/or supplied from the inflator 20. Since the airbag cushion 10 is disposed between the driver seat and the passenger seat, the airbag cushion 10 may absorb an impact between the driver seat occupant and the passenger seat occupant to protect the occupants.

As shown in the drawing, the airbag cushion 10 may have a restraining portion 12 that is not inflated by the gas when deployed. That is, the airbag cushion 10 may include a chamber 11 that is inflated by the gas and a restraining portion 12 that is not inflated by the gas.

The airbag cushion 10 may be installed on a seat frame (not shown) inside the seatback on the side surface of the seatback through a mount 40. The mount 40 may be provided in a rear end portion of the airbag cushion 10 and installed in the seatback. In this case, the mount 40 may be positioned in a lower portion of the airbag cushion 10.

The inflator 20 may be installed on the mount 40, and the inflator 20 may be disposed inside the airbag cushion 10.

The inflator 20 may generate gas according to a signal transmitted from an airbag control unit (ACU, not shown). A gas generator and an ignition device may be built in the inflator 20. In the embodiment, the inflator 20 may be provided as a cylinder type having a discharging port for discharging the gas in one end portion thereof.

The airbag cushion 10 may include a plurality of panels including, for example, a first panel 10A facing the driver seat and a second panel 10B facing the passenger seat. The first panel 10A and the second panel 10B may be made of a flexible fabric material, but the present invention is not limited thereto.

The airbag cushion 10 may have a single panel structure in which the first panel 10A and the second panel 10B are connected symmetrically left and right based on a central folding line FL. In a state in which the first panel 10A and the second panel 10B are folded along the folding line FL, an edge of the first panel 10A and an edge of the second panel 10B may be sewn along an edge sewing line S to form the airbag cushion 10.

In the present embodiment, the first panel 10A and the second panel 10B are provided as a single integrally connected panel structure, but the present invention is not limited thereto.

For example, in a state in which the first panel 10A and the second panel 10B, which are cut separately from each other and provided in a separate state, are folded, the edge of the first panel 10A and the edge of the second panel 10B are sewed to form the airbag cushion 10.

In the embodiment, a strap 14 for fixing the airbag cushion 10 in a roll-folded state to an outer surface thereof may be provided on one side of the first panel 10A and the second panel 10B.

To install the airbag cushion 10 in the seatback, the strap 14 wraps around a circumference of the airbag cushion 10 in the roll-folded state to restrain the airbag cushion 10 such that the airbag cushion 10 does not come loose. The strap 14 may be configured to break when the airbag cushion 10 is inflated.

The airbag cushion 10 may include a restraining portion 12 disposed at a position corresponding to the shoulder of the occupant. The restraining portion 12 is configured to restrain the movement of the occupant without being inflated by the gas.

The restraining portion 12 may be provided as a structure surrounded by a sewing line S1 that joins the panels 10A and 10B constituting the airbag cushion 10. That is, since the restraining portion 12 is sealed by the sewing line S1, the gas is not introduced into the restraining portion 12 when the airbag cushion 10 is inflated, and thus the restraining portion 12 may form a non-inflatable area that is not inflated. The restraining portion 12 implements a sunken groove structure in each of the surfaces of the airbag cushion 10 facing the driver seat and the passenger seat.

In the event of a collision, the shoulder of the occupant is caught inside the restraining portion 12, and tension is applied in a direction opposite to a direction in which the shoulder is pushed due to inertia inside the restraining portion 12, and thus the occupant is restrained, thereby limiting the movement amount of the occupant. Accordingly, a phenomenon in which the airbag cushion 10 rotates and moves away from the occupant due to the ineffective restraint of the movement of the occupant in the related art may be prevented from occurring, and thus a restraining force for the occupant may be increased. As a result, it is possible to more effectively prevent the occupant from being injured in a collision.

The restraining portion 12 may be positioned behind a vertical center line CL that divides the airbag cushion 10 into two in a width direction (an X-axis direction). In the embodiment, the restraining portion 12 may be positioned above the mount 40 in a rear end portion of the airbag cushion 10.

The restraining portion 12 may include a first restraining portion 12-1 and a second restraining portion 12-2 that extend parallel to a longitudinal direction (a Y-axis direction) of the airbag cushion 10.

Each of the first restraining portion 12-1 and the second restraining portion 12-2 may be provided as a structure that extends in a rectangular shape such that the shoulder of the occupant and the arm of the occupant corresponding to the shoulder to the elbow partially enter the first restraining portion 12-1 and the second restraining portion 12-2.

A gas passage 13 through which the gas passes may be provided between the first restraining portion 12-1 and the second restraining portion 12-2. The first restraining portion 12-1 may be disposed in front of the gas passage 13, and a second restraining portion 12-2 may be disposed behind the gas passage 13.

The length and width of the first restraining portion 12-1 and the length and width of the second restraining portion 12-2 may be the same. However, the structure of each of the first restraining portion 12-1 and the second restraining portion 12-2 is not limited to this.

As shown in FIG. 3, the length and width of the first restraining portion 12-1 and the length and width of the second restraining portion 12-2 may be different from each other, and thus the first restraining portion 12-1 and the second restraining portion 12-2 may be an asymmetric structure. For example, the length and width of the first restraining portion 12-1 may be configured to be larger than those of the second restraining portion 12-2.

As shown in FIG. 4, each of the first restraining portion 12-1 and the second restraining portion 12-2 may have a structure of which the width decreases from an upper portion toward a lower portion of the airbag cushion 10. That is, the shape of the restraining portion 12 may be an overall inverted triangle shape.

This structure is designed such that the restraining portion 12 has an asymmetrical structure in a front-rear direction or an vertical direction, taking into account the physical characteristics of the arm in that a portion adjacent to the shoulder has a relatively greater thickness than other portions and the fact that the shoulder portion comes into contact with the airbag cushion 10 first in the event of a collision, and as a result, it is possible to restrain the forward movement of the occupant more effectively.

The gas passage 13 provided between the first restraining portion 12-1 and the second restraining portion 12-2 may function as a damper that alleviates the impact force exerted on the occupants when the occupants collide with each other. In this case, the thickness of the gas passage 13 in inflation (i.e., when the gas passage 13 is fully inflated) may be smaller than the thickness of the chamber 11 in inflation (i.e., when the chamber 11 is fully inflated).

Meanwhile, the airbag cushion 10 may include an inner non-inflatable portion R1 provided in (or located at) the center of the chamber 11 that is surrounded by the sewing line S and configured to be inflated when supplied with the gas, and an outer non-inflatable portion R2 disposed outside the chamber 11.

The outer non-inflatable portion R2 may be positioned in front of the vertical center line CL and disposed outside the edge sewing line S such that the gas does not flow therein.

A first tether hole 15 through which the tether 30 passes to be connected to the outer non-inflatable portion R2 may be formed or located in the outer non-inflatable portion R2.

The inner non-inflatable portion R1 may be positioned between the outer non-inflatable portion R2 and the restraining portion 12.

The inner non-inflatable portion R1 may be disposed as a structure across which the vertical center line CL passes and may extend in a curved shape from an upper rear portion of the airbag cushion 10 toward a lower front portion.

The inner non-inflatable portion R1 may limit the thickness of the airbag cushion 10 in inflation, and in conjunction with the tether 30 to be described below, may function as a bending line to partially bend the airbag cushion 10 toward the seatback at the inner non-inflatable portion R1.

A second tether hole 16 through which the tether 30 passes to be connected to the inner non-inflatable portion R1 may be formed in the inner non-inflatable portion R1.

The tether 30 may pass through the airbag cushion 10 and may be connected to the airbag cushion 10.

In the tether 30, one end may be rotatably coupled to the mount 40, may pass through the first tether hole 15 and the second tether hole 16, and may be connected to the airbag cushion 10, and then the other end may be rotatably coupled to the mount 40. Accordingly, during the process of inflating the airbag cushion 10, the tether 30 rotates in response to the changing shape of the airbag cushion 10, and thus the position at which the airbag cushion 10 is supported may be adjusted.

A first section 31 between one end of the tether 30 and the first tether hole 15 and a second section 32 between the other end of the tether 30 and the second tether hole 16 may be disposed to be exposed to the outside of the first panel 10A (toward the driver seat), and a third section 33 between the first tether hole 15 and the second tether hole 16 may be disposed to be exposed to the outside of the second panel 10B (toward the passenger seat).

As a result of this structure, when the airbag cushion 10 is deployed, the first section 31 and the second section 32 each pull the third section 33 to support a front end portion of the airbag cushion 10, thereby preventing the front end portion of the airbag cushion 10 from rotating toward the passenger seat.

In particular, since the first section 31 and the second section 32 are disposed on a path crossing the airbag cushion 10 at a position facing the driver seat occupant, the first section 31 and the second section 32 are pressed toward the airbag cushion 10 by the movement of the driver seat occupant. Accordingly, tension applied to the first section 31 increases, and thus the front end portion of the airbag cushion 10 is pulled and bent more reliably toward the seatback. Therefore, it is possible to restrain the driver seat occupant more securely.

In the present embodiment, since the first tether hole 15 is formed in the outer non-inflatable portion R2 separated from the chamber 11, even when large tension is applied to the third section 33 by the first section 31 in a state in which the airbag cushion 10 is inflated by the deployment pressure, the airbag cushion 10 including the chamber 11 is not affected.

Figure 5:
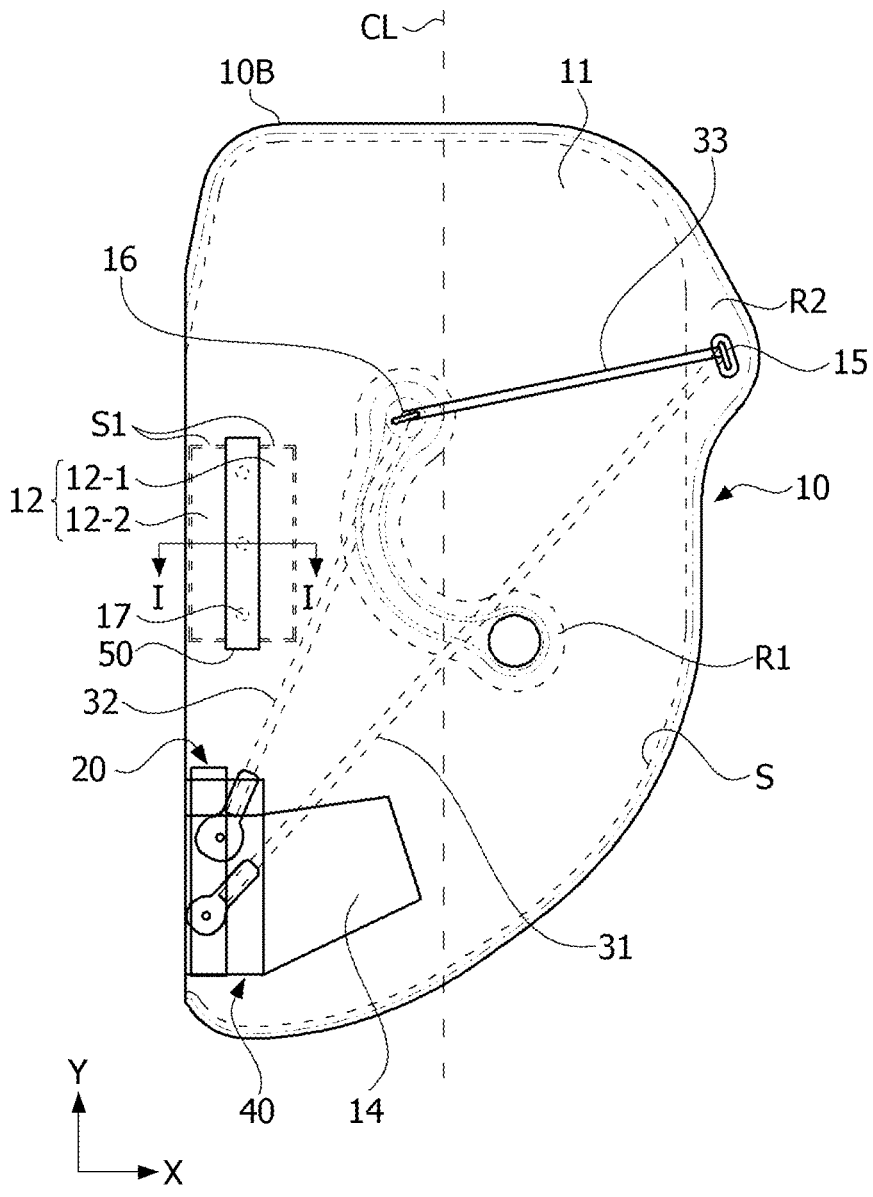
FIG. 5 is a view showing an airbag cushion according to another embodiment.
Figure 6:
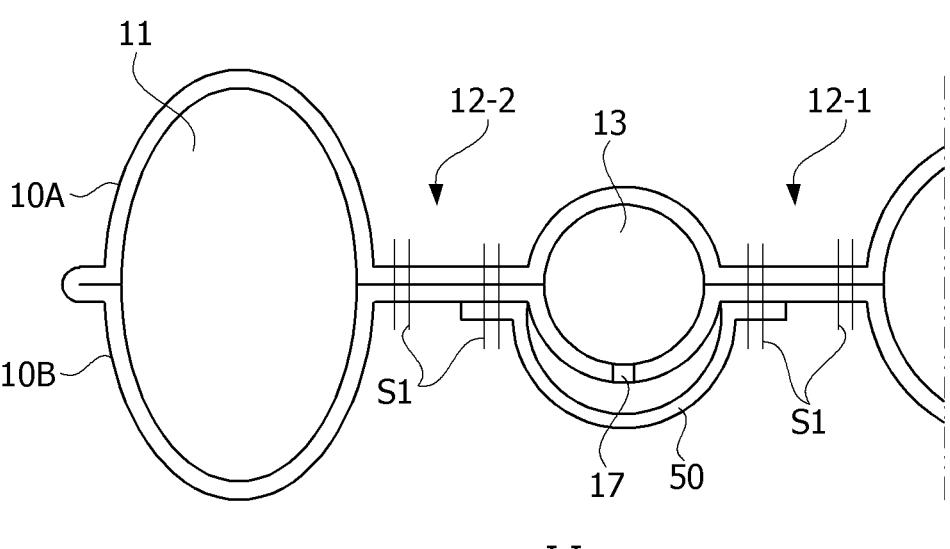
FIG. 6 is a cross-sectional view along line I-I in FIG. 5.

FIGS. 5 and 6 show another embodiment of the airbag cushion 10. FIG. 5 is a view showing an airbag cushion according to another embodiment, and FIG. 6 is a cross-sectional view along line I-I in FIG. 5.

Referring to the drawing, the airbag cushion 10 may further include a sub-cushion 50.

The sub-cushion 50 may be attached to the surface of the airbag cushion 10 facing the passenger seat and configured to protrude from the airbag cushion 10 when inflated by the gas. In this case, the thickness of the sub-cushion 50 in inflation (i.e., when the cushion 50 is fully inflated) may be smaller than the thickness of the airbag cushion 10 in inflation (e.g., when the airbag cushion 10 is fully inflated). Specifically, in a state in which the airbag cushion 10 is inflated, the thickness of the gas passage 13 and the sub-cushion 50 may be smaller than the thickness of the chamber 11.

The sub-cushion 50 may be provided to overlap the gas passage 13. Additionally, a gas hole 17 connected to the sub-cushion 50 may be formed in the surface of the airbag cushion 10 facing the passenger seat. The gas hole 17 may be formed as a single gas hole or a plurality of gas holes in the gas passage 13.

The sub-cushion 50 may prevent the shoulders of the occupants from directly colliding with each other while being inflated along the gas passage 13, thereby alleviating the impact force. Therefore, it is possible to protect the occupants more effectively.

In the embodiment, the sub-cushion 50 may be made of a flexible fabric material, but the present invention is not limited thereto.

The sub-cushion 50 may be put on the second panel 10B of the airbag cushion 10 at a position at which the gas passage 13 is to be formed and sewed along a circumference thereof to be joined to the second panel 10B, thereby being coupled to the airbag cushion 10.

As described above, the side airbag device 1 according to the embodiments of the present invention is configured such that the front end portion of the airbag cushion 10 is bent and deformed toward the seatback during the process in which the airbag cushion 10 is inflated and deployed in the event of a vehicle collision to restrain the occupant (the driver) by surrounding the trunk to the head of the occupant.

Accordingly, problems due to the case in which the side airbag device of the related art may not restrain the movement of the driver seat occupant because the side airbag device does not have a self-supporting force and may collapse according to the lateral movement of the occupant, and the phenomenon that the position of the cushion is freely changed while the cushion is rotated between the driver seat occupant and the passenger seat occupant, do not occur.

In particular, the restraining portion having a concavely sunken structure is provided at a position corresponding to the shoulder of the occupant, and the shoulder of the occupant is caught inside the restraining portion to restrain the movement of the occupant, thereby protecting the occupant more stably and minimizing the occurrence of injury.

According to embodiments of the present invention, a side airbag device capable of sufficiently restraining an occupant when an airbag cushion is deployed from a seatback can be provided.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A side airbag device comprising:
an airbag cushion configured, when supplied with gas, to inflate and deploy between a driver seat and a passenger seat of a vehicle; and
an inflator disposed within the airbag cushion and mounted on a mount disposed in a rear end portion of the airbag cushion,
wherein the airbag cushion includes a restraining portion configured to restrain movement of an occupant of the vehicle, the restraining portion disposed corresponding to a shoulder of the occupant and configured not to be inflated when the airbag cushion is inflated by the gas, and
wherein the restraining portion longitudinally extends parallel to a longitudinal direction of the airbag cushion.

2. The side airbag device of claim 1, wherein:
the restraining portion includes a first restraining portion and a second restraining portion that longitudinally extend parallel to the longitudinal direction of the airbag cushion, and
a gas passage through which the gas passes is provided between the first restraining portion and the second restraining portion.

3. The side airbag device of claim 2, wherein each of the first restraining portion and the second restraining portion has a structure of which a width decreases from an upper portion toward a lower portion of the airbag cushion.

4. A side airbag device comprising:
an airbag cushion configured, when supplied with gas, to inflate and deploy between a driver seat and a passenger seat of a vehicle; and
an inflator disposed within the airbag cushion and mounted on a mount disposed in a rear end portion of the airbag cushion,
wherein the airbag cushion includes a restraining portion disposed at a position corresponding to a shoulder of an occupant of the vehicle and configured to restrain movement of the occupant in a state in which the restraining portion is not inflated by the gas,
wherein the restraining portion includes a first restraining portion and a second restraining portion that extend in a longitudinal direction of the airbag cushion,
wherein a gas passage through which the gas passes is provided between the first restraining portion and the second restraining portion, and wherein the side airbag device further comprises a sub-cushion attached to a surface of the airbag cushion facing the passenger seat and protruding from the airbag cushion when inflated by the gas.

5. The side airbag device of claim 4, wherein:
the sub-cushion overlaps the gas passage, and
a gas hole, which is connected to the sub-cushion, is formed in the surface of the airbag cushion facing the passenger seat.

6. The side airbag device of claim 4, wherein, when fully inflated, the sub-cushion has a thickness smaller than that of the airbag cushion.

7. The side airbag device of claim 1, wherein the restraining portion has a structure surrounded by a sewing line that joins a plurality of panels constituting the airbag cushion.

8. The side airbag device of claim 1, further comprising a tether that passes through the airbag cushion to be connected to the airbag cushion.

9. The side airbag device of claim 8, wherein the airbag cushion has a tether hole through which the tether passes.

10. A side airbag device of claim 9, comprising:
an airbag cushion configured, when supplied with gas, to inflate and deploy between a driver seat and a passenger seat of a vehicle; and
an inflator disposed within the airbag cushion and mounted on a mount disposed in a rear end portion of the airbag cushion,
wherein the airbag cushion includes a restraining portion disposed at a position corresponding to a shoulder of an occupant of the vehicle and configured to restrain movement of the occupant in a state in which the restraining portion is not inflated by the gas,
wherein the side airbag device further comprises a tether that passes through the airbag cushion to be connected to the airbag cushion,
wherein the airbag cushion has a tether hole through which the tether passes, and
wherein the airbag cushion includes:
an inner non-inflatable portion located at a center of a chamber that is surrounded by a sewing line and configured to be inflated when supplied with the gas, and
an outer non-inflatable portion disposed outside the chamber,
wherein the tether hole is located in each of the inner non-inflatable portion and the outer non-inflatable portion.

11. The side airbag device of claim 1, wherein the restraining portion has a sunken groove structure.

12. The side airbag device of claim 1, wherein the restraining portion is positioned behind a vertical center line that divides the airbag cushion into two in a width direction.

13. The side airbag device of claim 12, wherein the restraining portion is positioned at a rear end portion of the airbag cushion.

* * * * *